(12) United States Patent
Yamada et al.

(10) Patent No.: US 8,651,578 B2
(45) Date of Patent: Feb. 18, 2014

(54) SEAT RECLINING APPARATUS FOR VEHICLE

(75) Inventors: Yukifumi Yamada, Toyota (JP); Naoaki Hoshihara, Obu (JP); Hiroyuki Okazaki, Chiryu (JP); Mikihito Nagura, Okazaki (JP); Shinya Isobe, Nagoya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 70 days.

(21) Appl. No.: 13/404,346

(22) Filed: Feb. 24, 2012

(65) Prior Publication Data

US 2012/0217782 A1     Aug. 30, 2012

(30) Foreign Application Priority Data

| Feb. 24, 2011 | (JP) | 2011-038376 |
| Jun. 13, 2011 | (JP) | 2011-131469 |
| Jan. 20, 2012 | (JP) | 2012-010353 |

(51) Int. Cl.
    *B60N 2/235*      (2006.01)

(52) U.S. Cl.
    USPC ............................................ 297/367 P

(58) Field of Classification Search
    USPC ........................................ 297/367 P
    See application file for complete search history.

(56) References Cited

U.S. PATENT DOCUMENTS

| 5,785,386 A | 7/1998 | Yoshida |
| 2005/0073185 A1 | 4/2005 | Uramichi |
| 2008/0185892 A1 | 8/2008 | Peters et al. |
| 2011/0012414 A1 | 1/2011 | Yamada et al. |
| 2011/0115271 A1* | 5/2011 | Yamada et al. ............ 297/367 P |

FOREIGN PATENT DOCUMENTS

| DE | 10 2005 046 807 B3 | 11/2006 |
| EP | 0 773 133 A2 | 5/1997 |
| JP | 2002-177083 | 6/2002 |

OTHER PUBLICATIONS

Extended European Search Report issued Jun. 6, 2012, in Patent Application No. 12156859.6.

* cited by examiner

*Primary Examiner* — Rodney B White
(74) *Attorney, Agent, or Firm* — Oblon, Spivak, McClelland, Maier & Neustadt, L.L.P.

(57) ABSTRACT

A seat reclining apparatus for a vehicle, includes a first arm, a second arm rotatably supported by the first arm, a pawl including external teeth engageable with internal teeth, a cam portion and plural pawl-side cam surfaces arranged at the cam portion, a cam including a cam surface engaging with the cam portion formed at the pawl, and a biasing member biasing the cam to rotate and causing the cam surface to press the cam portion in a radial direction. The plural pawl-side cam surfaces or the cam surface is configured in a manner that the plural pawl-side cam surfaces and the cam surface are in contact with each other when the external teeth and the internal teeth are in an engaged state and in a manner that clearances generated between each of the plural pawl-side cam surfaces and the cam surface in the radial direction are all uniform.

8 Claims, 7 Drawing Sheets

SEAT RECLINING APPARATUS FOR VEHICLE

CROSS REFERENCE TO RELATED APPLICATIONS

This application is based on and claims priority under 35 U.S.C. §119 to Japanese Patent Application 2011-038376, filed on Feb. 24, 2011, Japanese Patent Application 2011-131469, filed on Jun. 13, 2011, and Japanese Patent Application 2012-010353, filed on Jan. 20, 2012, the entire contents of which are incorporated herein by reference.

TECHNICAL FIELD

This disclosure generally relates to a seat reclining apparatus for a vehicle.

BACKGROUND DISCUSSION

A known seat reclining apparatus for a vehicle, which adjusts a reclining angle of a seatback relative to a seat cushion, is disclosed in, for example, JP2002-177083A (hereinafter referred to as Patent reference 1). The known seat reclining apparatus for the vehicle disclosed in Patent reference 1 includes a gear plate provided with internal teeth, a base plate supported by the gear plate, pawls of which movement in a radial direction is guided by guide walls provided at the base plate and a cam engaging with the pawls. A rotation of the cam causes the pawls guided by the base plate (the guide walls) to reciprocate in the radial direction, thereby bringing the internal teeth of the gear plate and external teeth of each pawl into engagement with each other and releasing the engagement thereof. Thus, a rotation of the gear plate relative to the base plate is restricted and allowed. Accordingly, a rotation of the seatback relative to the seat cushion is restricted and allowed, and the seatback may be adjusted and retained at an inclination angle suitable for, for example, an occupant to be seated.

In addition, according to the known seat reclining apparatus for the vehicle disclosed in Patent reference 1, a technique for reducing an operating force for releasing the engagement between the internal teeth of the gear plate and the external teeth of each of the pawls in a case where, for example, the occupant is leaning against the seatback is disclosed. In order to facilitate a smooth reciprocating movement of each pawl in the radial direction, a distance between adjacent guide walls is usually set to be slightly greater than a width of each pawl, and thus a clearance is provided between the guide wall and the pawl. In this case, when the occupant is leaning against the seatback while the engagement between the internal teeth of the gear plate and the external teeth of each pawl is coming to be released, each pawl that has started moving in the radial direction may incline in a circumferential direction (that is, relative to the internal teeth) within a range of the clearance in a manner that one of the external teeth serves as a supporting point. As the pawl inclines, it presses the base plate (the guide wall), resulting in an increased frictional force of the pawl sliding on the base plate, thereby requiring a larger operating force.

Consequently, according to the known seat reclining apparatus for the vehicle disclosed in Patent reference 1, the external teeth of each pawl are formed so that a clearance is provided between a tooth face of at least one of the external teeth, which is positioned at each end in a width direction, and a tooth face of the corresponding internal tooth in a state where the internal teeth and the external teeth are engaged with each other. Thus, even though the occupant is leaning against the seat back while the engagement between the internal teeth of the gear plate and the external teeth of each pawl is coming to be released, a pressing force of each pawl against the base plate (the guide wall) is reduced, thereby reducing the frictional force of the pawl sliding on the base plate.

As each pawl includes plural external teeth, in a case where the pawl inclines in the circumferential direction in a manner described above, the engagement state between the external teeth of the pawl and the internal teeth of the gear plate may not be released uniformly or evenly. Part of the external teeth of the pawl may be caught by the internal teeth of the gear plate before a release of the engaged state is completed for the following reason. In a state where no external force is applied to a gear plate side, the cam pulls each pawl toward a radial center for unlocking. However, in a state where the external force is applied to the gear plate side, a component force toward a central direction is applied to each pawl depending on a pressure angle of a tooth contact area, and thus the pawl tends to disengage before the cam allows the pawl to do so in order to fill the clearance generated between a back portion of each pawl and a protruding portion of the cam. At this time, an abnormal noise is generated, thereby deteriorating an operating feeling.

A need thus exists for a seat reclining apparatus for a vehicle which is not susceptible to the drawback mentioned above.

SUMMARY

According to an aspect of this disclosure, a seat reclining apparatus for a vehicle, includes a first arm configured to be fixedly attached to one of a seat cushion and a seatback, a second arm configured to be fixedly attached to the other one of the seat cushion and the seatback and rotatably supported by the first arm, a pawl, of which movement in a radial direction is guided by a guide wall provided at the first arm, including external teeth which are provided at a radially outer surface of the pawl and are engageable with internal teeth provided at the second arm, the pawl including a cam portion formed at a radially inner surface of the pawl and plural pawl-side cam surfaces arranged at the cam portion in a circumferential direction of the cam portion, a cam engaging with the pawl and rotatably provided at a central portion of the first arm, the cam including a cam surface engaging with the cam portion formed at the pawl, and a biasing member biasing the cam to rotate in one direction and causing the cam surface to press the cam portion in a radial direction in which the external teeth and the internal teeth engage with each other. The plural pawl-side cam surfaces or the cam surface is configured in a manner that the plural pawl-side cam surfaces and the cam surface are in contact with each other when the external teeth and the internal teeth are in an engaged state and in a manner that clearances, which are generated between each of the plural pawl-side cam surfaces and the cam surface in the radial direction when the pawl is moved by a rotational operation of the cam against a biasing force of the biasing member in the radial direction in which the engaged state of the external teeth and the internal teeth is released, are all uniform.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1A:
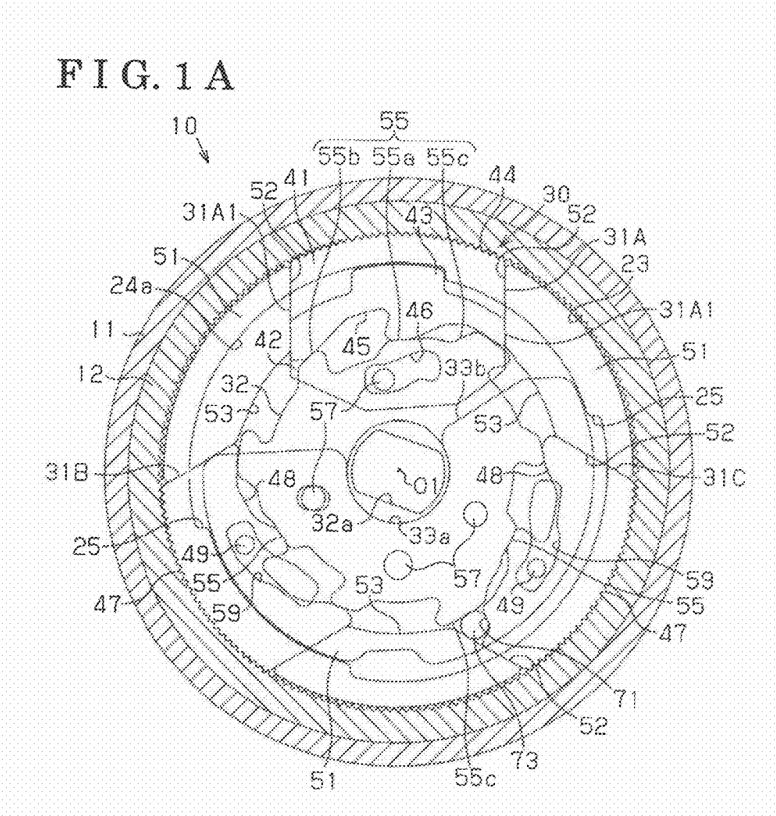
FIG. 1A is a lateral cross-sectional view illustrating a seat reclining apparatus for a vehicle of a first embodiment disclosed here.
Figure 1B:
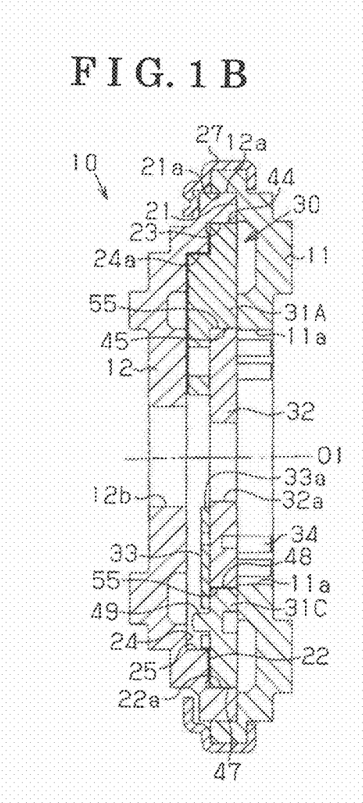
FIG. 1B is a longitudinal cross-sectional view illustrating the seat reclining apparatus for the vehicle of the first embodiment.

A first embodiment will be described with reference to FIGS. 1 to 4. As shown in FIGS. 1A and 1B, a seat reclining apparatus 10 for a vehicle according to the first embodiment includes a lower arm 11 (i.e., a first arm) formed into a disc shape and an upper arm 12 (i.e., a second arm) formed into a disc shape. The lower arm 11 is fixed to a seat cushion constituting a seating portion of a seat for the vehicle. The upper arm 12 is fixed to a seatback constituting a back rest of the seat for the vehicle.

The lower arm 11 includes a recessed portion 21 formed by a half blanking process into a circular shape and opening toward the upper arm 12, and a through hole 11a formed in a central portion of the lower arm 11. The recessed portion 21 of the lower arm 11 includes an inner circumferential surface 21a centered with respect to a rotational axis O1, which is a rotational axis common to the upper arm 12 and the lower arm 11. The upper arm 12 fits in the lower arm 11 in a manner that an outer circumferential surface 12a of the upper arm 12 slidably contacts with the inner circumferential surface 21a of the lower arm 11.

On the other hand, the upper arm 12 includes a recessed portion 22 formed by a half blanking process into a circular shape and opening toward the lower arm 11, and a through hole 12b formed in a central portion of the upper arm 12. The recessed portion 22 of the upper arm 12 includes an inner circumferential surface 22a centered with respect to the rotational axis O1. The inner circumferential surface 22a of the recessed portion 22 is provided with internal teeth 23 formed along an entire circumference of the inner circumferential surface 22a. A recessed portion 24 is formed in an inside of the recessed portion 22 by the half blanking process so as to be concentric with the recessed portion 22. A protrusion 25 protruding toward the rotational axis O1 is formed at two positions of an inner circumferential surface 24a of the recessed portion 24 so as to be aligned in a circumferential direction of the upper arm 12.

In a state where the inner circumferential surface 21a of the recessed portion 21 of the lower arm 11 and the outer circumferential surface 12a of the upper arm 12 fit with each other, a holder 27 made of a metal sheet and having a ring shape is attached to outer circumferential portions of the lower arm 11 and of the upper arm 12. The holder 27 restricts the lower arm 11 and the upper arm 12 from coming off from each other in an axial direction thereof while allowing a relative rotation between the lower arm 11 and the upper arm 12.

Figure 2:
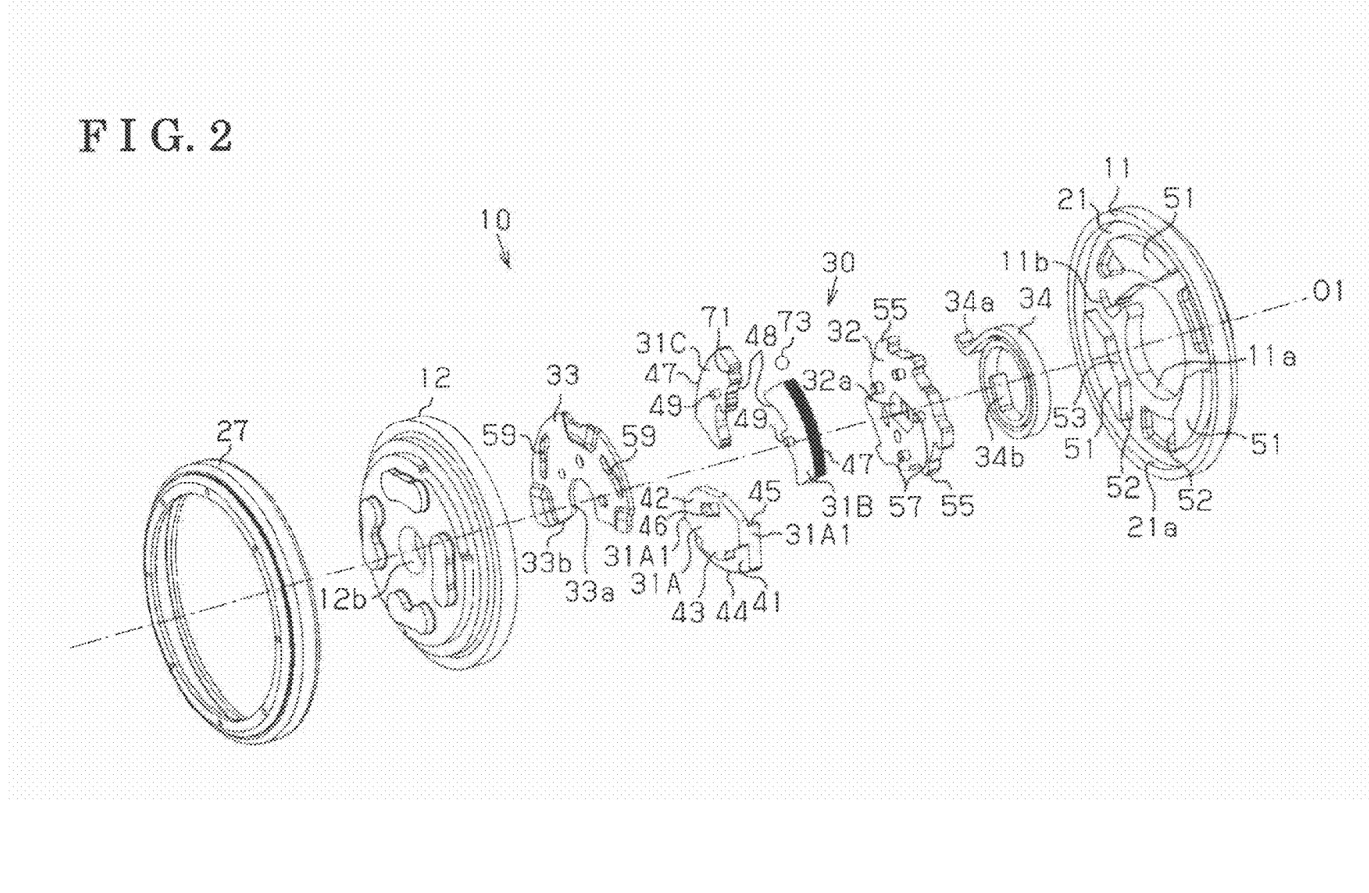
FIG. 2 is an exploded perspective view illustrating the seat reclining apparatus for the vehicle of the first embodiment.

A lock mechanism 30 is disposed between the lower arm 11 and the upper arm 12. As shown in FIG. 2, the lock mechanism 30 is mainly constituted by a first pawl 31A (i.e., a pawl), a second pawl 31B (i.e., the pawl), a third pawl 31C (i.e., the pawl), a cam 32, a release plate 33 and a spiral spring 34 (i.e., a biasing member). The first pawl 31A, the second pawl 31B and the third pawl 31C are arranged in plane perpendicular to the rotational axis O1 so as to be aligned in the circumferential direction by leaving an equal angle between adjacent pawls.

The first pawl 31A is made by, for example, forging steel material and includes a first block 41 and a second block 42 which are formed to be stepwise relative to each other in an axial direction. As shown in FIG. 1A, the first pawl 31A is arranged so that the first block 41 is positioned in a vicinity of the inner circumferential surface 22a (refer to FIG. 1B) of the upper arm 12 and so that the second block 42 is positioned in a vicinity of the axis of the upper arm 12. Width-direction end portions 31A1 of the first block 41 and the second block 42 coincide with each other, and are formed to be straight lines parallel to each other. External teeth 44 engageable with the internal teeth 23 of the upper arm 12 are formed at an outward end, that is, a radially outer surface (the end surface facing the internal teeth 23 of the upper arm 12) of the first block 41. An inner surface cam portion 45 (i.e., a cam portion) which engages with an outer circumferential portion of the cam 32 is formed at an inward end, that is, a radially inner surface (the end surface facing the opposite direction to the outward end) of the first block 41. Further, a pawl-side groove cam portion 46 is provided at a substantially central portion of the second block 42 so as to penetrate the second block 42 in a thickness direction thereof.

On the other hand, each of the second pawl 31B and the third pawl 31C is made by, for example, pressing or stamping a steel plate. The shapes of the second and third pawls 31B, 31C are similar to a shape of the first pawl 31A not including steps, that is, the shape that includes the first block 41 but does not include the second block 42. In other words, each of the second pawl 31B and the third pawl 31C is formed to be shorter in a radial direction thereof than the first pawl 31A by a length of the second block 42 and to be thinner than the first pawl 31A by a thickness of the second block 42. Similarly to the first pawl 31A, each of the second pawl 31B and the third pawl 31C includes width-direction end portions which are formed to be straight lines parallel to each other. External teeth 47 engageable with the internal teeth 23 of the upper arm 12 is formed at an outward end of each of the second pawl 31B and the third pawl 31C. An inner surface cam portion 48 (i.e., the cam portion) which is formed at a radially inner surface and engages with the outer circumferential portion of the cam 32 is formed at each of the second pawl 31B and the third pawl 31C. Further, an engaging protrusion 49 is protrudingly provided at a substantially central portion of each of the second pawl 31B and the third pawl 31C in a width direction thereof.

Figure 3A:
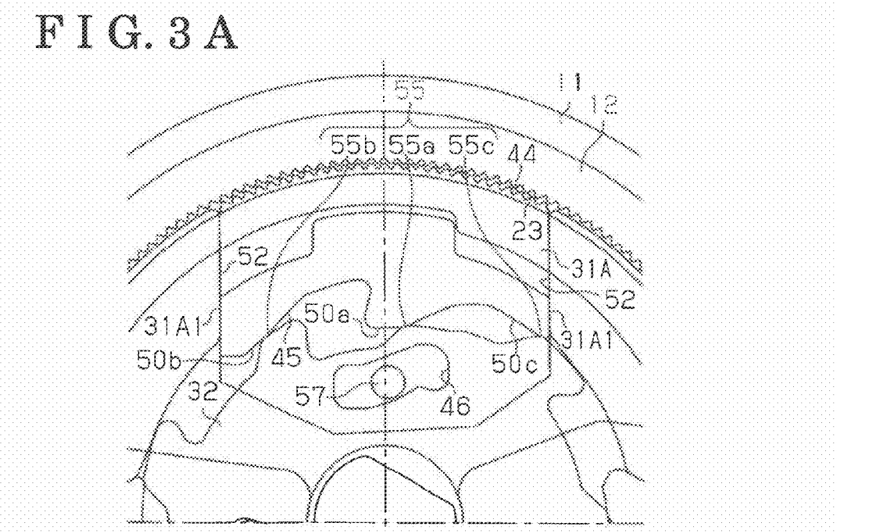
FIG. 3A is a view explaining a state of the seat reclining apparatus for the vehicle of the first embodiment immediately before an engaged state is released.
Figure 3B:
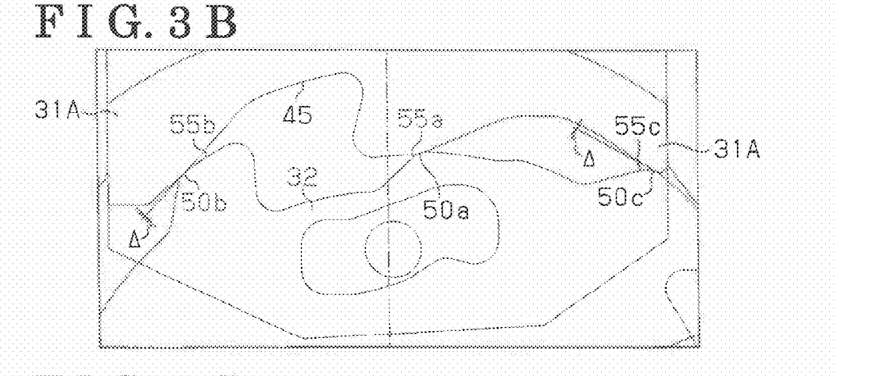
FIG. 3B is an enlarged view explaining the state of the seat reclining apparatus for the vehicle of the first embodiment immediately before the engaged state is released.
Figure 3C:
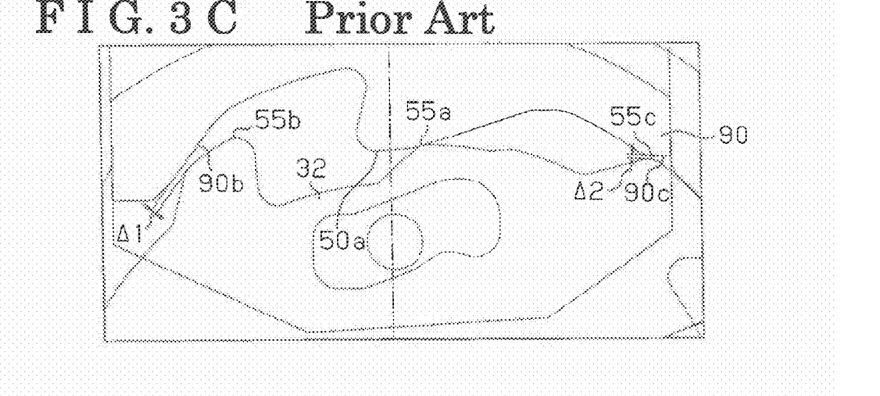
FIG. 3C is a view explaining the state of a known seat reclining apparatus for a vehicle immediately before the engaged state is released.

As shown in FIGS. 3A and 3B, the inner surface cam portion 45 that is formed at a step portion of the first pawl 31A includes plural, for example, three pawl-side cam surfaces 50a, 50b, 50c arranged in a circumferential direction of the inner surface cam portion 45. The pawl-side cam surface 50a is provided at a substantially central portion of the first pawl 31A, and the pawl-side cam surfaces 50b, 50c are provided at end portions of the first pawl 31A in the circumferential direction thereof. The pawl-side cam surfaces 50a, 50b, 50c face the outer circumferential portion (a cam surface 55) of the cam 32 and are pressed by the cam surface 55. The pawl-side cam surface 50a provided in the substantially central portion of the first pawl 31A and the pawl-side cam surface 50b provided forward in a locking rotational direction of the cam 32 are constituted by a cam surface including inclined surfaces that approach the cam surface 55 of the cam 32 as the cam 32 rotates in the locking rotational direction (a counter-clockwise rotational direction in FIG. 3). The pawl-side cam surface 50c positioned rearward in the locking rotational direction of the cam 32 is constituted by a substantially circular arc-shaped surface of which center is a rotation center of the cam 32.

The inner surface cam portion 48 formed in an inward end of the second pawl 31B is formed in a substantially identical shape to that of the inner surface cam portion 45 of the first pawl 31A. On the other hand, the third pawl 31C is formed in a substantially identical shape to that of the second pawl 31B, however, the third pawl 31C differs from the second pawl 31B only in that the third pawl 31C includes an inclined surface 71 instead of the pawl-side cam surface 50c as shown in FIG. 1A.

As shown in FIG. 2, plural, for example, three guide walls 51 are provided in an inside of the recessed portion 21 of the lower arm 11 so as to be aligned in a circumferential direction of the lower arm 11, leaving an equal angle between adjacent guide walls 51. Each guide wall 51 includes guide surfaces 52. The guide surfaces 52, which are positioned between two adjacent guide walls 51, are formed facing parallelly to each other so as to slidably guide the width-direction end portions of the first pawl 31A, the second pawl 31B and the third pawl 31C. Accordingly, the first pawl 31A, the second pawl 31B and the third pawl 31C are guided by the corresponding guide surfaces 52 and slide in a radial direction of the lower arm 11 and the upper arm 12, and thus the external teeth 44, 47 of the first pawl 31A, the second pawl 31B and the third pawl 31C are engageable with and disengageable from the internal teeth 23 of the upper arm 12. A circular arc surface 53 of which center is the rotational axis O1 is formed at an inner circumferential portion of each guide wall 51.

The inclined surface 71 is provided at a surface, which is positioned rearward in the locking rotational direction of the cam 32, of the third pawl 31C so as to face the guide surface 52. The inclined surface 71 is formed to be linear in a manner that a width of a clearance between the inclined surface 71 and the guide surface 52 of the guide wall 51 becomes continually smaller toward the radially outward direction of the third pawl 31C. In other words, the inclined surface 71 is formed so that the width of the clearance between the inclined surface 71 and the corresponding guide surface 52 of the guide wall 51 becomes gradually smaller toward the radially outward direction of the third pawl 31C. A wedge member 73 having a spherical shape is disposed between the guide surface 52 and the inclined surface 71 so as to touch the guide surface 52 and the inclined surface 71. The wedge member 73 is held in a sandwiched manner between a side surface of the recessed portion 21 of the lower arm 11 and by a peripheral edge portion of the release plate 33 in an axial direction of the cam 32 so as to be movable in a radial direction of the cam 32 while being in contact with the guide surface 52 and the inclined surface 71. The wedge member 73 is pressed by the cam surface 55 of the cam 32 outwardly in the radial direction of the cam 32 against the inclined surface 71, and thus causes the third pawl 31C engaging with the upper arm 12 to move relative to the guide wall 51 provided at the lower arm 11 in a direction in which the third pawl 31C moves away from the guide wall 51.

The cam 32 is arranged in the recessed portion 22 of the upper arm 12 so as to be rotatable about the rotational axis O1 and includes a through hole 32a formed in a central portion thereof. The cam 32 also includes, plural, for example, three cam surfaces 55 provided at an outer circumferential edge of the cam 32 so as to be aligned in the circumferential direction, leaving an equal angle between adjacent cam surfaces 55. Among the three cam surfaces 55, one cam surface 55 is positioned to be engageable with the pawl-side cam surfaces 50a, 50b, 50c formed at the inner surface cam portion 45 of the first pawl 31A, another cam surface 55 is positioned to be engageable with the pawl-side cam surfaces 50a, 50b, 50c of the inner surface cam portion 48 of the second pawl 31B, and the other cam surface 55 is positioned to be engageable with the pawl-side cam surfaces 50a, 50b of the inner surface cam portion 48 of the third pawl 31C and with the wedge member 73. The cam surfaces 55 press portions, which are positioned in the vicinities of engagement portions between the external teeth 44, 47 and the internal teeth 23, of the first pawl 31A, the second pawl 31B and the third pawl 31C, thereby reliably lock the upper arm 12 relative to the lower arm 11.

As shown in FIG. 1A, among the three cam surfaces 55, each of the two cam surfaces 55 that are engageable with the first and the second pawls 31A, 31B is constituted by plural, for example, three pressing cam portions 55a, 55b, 55c that are contactable with the pawl-side cam surfaces 50a, 50b, 50c, respectively. The other cam surface 55 that is engageable with the third pawl 31C is constituted by the three pressing cam portions 55a, 55b, 55c that are contactable with the pawl-side cam surfaces 50a, 50b and with the wedge member 73. The pressing cam portions 55a, 55b, 55c of each cam surface 55 are maintained at angular positions at which the pressing cam portions 55a, 55b, 55c come in contact with the pawl-side cam surfaces 50a, 50b, 50c of the inner surface cam portion 45 of the first pawl 31A, with the pawl-side cam surfaces 50a, 50b, 50c of the inner surface cam portion 48 of the second pawl 31B, and with the pawl-side cam surfaces 50a, 50b of the third pawl 31C and the wedge member 73, respectively when the cam 32 is rotated and is at a locked position. When the cam 32 is rotated in an unlocking rotational direction, the pressing cam portions 55a, 55b, 55c come apart from, that is, disengage from, the pawl-side cam surfaces 50a, 50b, 50c of the inner surface cam portion 45 of the first pawl 31A, the pawl-side cam surfaces 50a, 50b, 50c of the inner surface cam portion 48 of the second pawl 31B, and the pawl-side cam surfaces 50a, 50b of the third pawl 31C and the wedge member 73, respectively. The number of the pressing cam portion 55a, 55b, 55c may be set to be same as the number of the pawl-side cam surfaces 50a, 50b, 50c.

Plural engaging protrusions 57 are protrudingly provided at a side surface, that is, the surface facing the first pawl 31A, the second pawl 31B and the third pawl 31C, of the cam 32 so as to be arranged in the circumferential direction of the cam 32, leaving a space between adjacent engaging protrusions 57. One of the plural engaging protrusions 57 is inserted in and engages with the pawl-side groove cam portion 46 of the first pawl 31A. The pawl-side groove cam portion 46 and the engaging protrusion 57 engaged with the pawl-side groove cam portion 46 cause the first pawl 31A to move inwardly in the radial direction of the first pawl 31A as the cam 32 rotates in the unlocking rotational direction.

The release plate 33 having a thin plate shape is integrally attached to the side surface of the cam 32 by engaging with the engaging protrusion 57. The release plate 33 includes a through hole 33a formed in a central portion thereof. The release plate 33 is attached to the cam 32 so that a position of the release plate 33 and a position of the second block 42 of the first pawl 31A in the axial direction coincide with each other and so that the release plate 33 is in slidably contact with a side surface of the second pawl 31B. Thus, the second pawl 31B, the third pawl 31C and the release plate 33 are fitted within an axial width of the first pawl 31A. The release plate 33 is made of a plate which has a substantially annular shape and is not in contact with the protrusion 25 formed at the upper arm 12. A cutout 33b having a fan-shape is formed at a portion of the plate having the substantially annular shape. The first pawl 31A is provided to correspond to the portion at which the cut-out 33b is formed. By cutting the fan-shape, which has an angle that corresponds to the first pawl 31A, out of the substantially annular-shaped plate, the release plate 33 is restricted from interfering with the first pawl 31A when the cam 32 rotates.

Plural, for example, two release plate-side groove cam portions 59 are formed at the release plate 33 so as to be aligned in the circumferential direction about a rotation center of the release plate 33 and so as to penetrate the release plate 33 in a thickness direction thereof. The release plate-side groove cam portions 59 are arranged to correspond to the side surfaces of the second pawl 31B and the third pawl 31C respectively and to be positioned more outwardly relative to the protrusions 57 in the radial direction of the cam 32. The engaging protrusions 49 protrudingly formed at the second pawl 31B and the third pawl 31C are inserted in and engaged with the release plate-side groove cam portions 59. Because the release plate-side groove cam portions 59 engage with the engaging protrusions 49, the second pawl 31B and the third pawl 31C are moved inwardly in the radial direction thereof as the release plate 33 rotates, together with the cam 32, in the unlocking rotational direction (a clockwise rotational direction in FIG. 1A).

The spiral spring 34 biases the cam 32 to rotate in one direction in which the first pawl 31A, the second pawl 31B and the third pawl 31C come to engage with the upper arm 12, and is accommodated in the through hole 11a of the lower arm 11. As shown in FIG. 2, the spiral spring 34 is formed by bending, for example, a flat wire having a rectangular cross section into a predetermined spiral shape and is disposed between the lower arm 11 and the cam 32. Specifically, an outer end portion 34a of the spiral spring 34 is locked at a locking hole 11b formed at the lower arm 11 and an inner end portion 34b of the spiral spring 34 is locked at a locking portion provided at an end surface of the cam 32.

The cam 32 is pushed by a biasing force of the spiral spring 34 to rotate relative to the lower arm 11 in the locking rotational direction (the counter-clockwise rotational direction in FIG. 1A). The cam surfaces 55 of the cam 32 press the first pawl 31A, the second pawl 31B and the third pawl 31C radially outwardly, and thus the external teeth 44 of the first pawl 31A and the external teeth 47 of the second pawl 31B and of the third pawl 31C are brought into engagement with the internal teeth 23 of the upper arm 12.

The cam 32 is connected to an operation handle for unlocking at the through hole 32a so as to rotate integrally with the operation handle. Via the operation handle, by performing a rotational operation relative to the cam 32 against the biasing force of the spiral spring 34, the release plate 33 is rotated together with the cam 32. Accordingly, the cam surfaces 55 come out of contact from the inner surface cam portions 45, 48 of the first pawl 31A, the second pawl 31B and the third pawl 31C. In addition, the first pawl 31A is pulled toward the rotational axis O1 along the guide surfaces 52 of the guide wall 51 by an effect of the engagement between the pawl-side groove cam portion 46 of the first pawl 31A and the engaging protrusion 57 of the cam 32, and thus the engagement between the external teeth 44 of the first pawl 31A and the internal teeth 23 is released. At the same time, the second pawl 31B and the third pawl 31C are pulled toward the rotational axis O1 along the guide surfaces 52 of the guide walls 51 by an effect of the engagement between the engaging protrusions 49 of the second and third pawls 31B, 31C and the release plate-side groove cam portions 59, and thus the engagement between the external teeth 47 of the second pawl 31B and the internal teeth 23, and the engagement between the external teeth 47 of the third pawl 31C and the internal teeth 23 are released.

Here, the pawl-side cam surfaces 50a, 50b, 50c of the first pawl 31A (the inner surface cam portion 45) or the cam surface 55 of the cam 32 is configured so that the cam surface 55 (the pressing cam portions 55a, 55b, 55c) of the cam 32 is in contact with all of the pawl-side cam surfaces 50a, 50b, 50c of the first pawl 31A (the inner surface cam portion 45) in a state where the external teeth 44 and the internal teeth 23 engage with each other, and so that the clearances, which are generated between the pawl-side cam surfaces 50a, 50b, 50c of the first pawl 31A and the cam surface 55 (the pressing cam portions 55a, 55b, 55c) in the radial direction while the first pawl 31A moves radially in a direction in which the engagement between the external teeth 44 and the internal teeth 23 comes to be released, are all uniform. As shown in FIGS. 3A and 3B, for example, immediately before the engagement between the external teeth 44 and the internal teeth 23 is released (hereinafter referred to also as a tooth tip-released state), each of the clearances generated between the pawl-side cam surfaces 50a, 50b, 50c and the pressing cam portions 55a, 55b, 55c in the radial direction is a clearance Δ, which is extremely small. On the contrary, according to a first pawl 90 of a known embodiment shown in FIG. 3C for reference, in the tooth tip-released state, a clearance Δ1 generated between the pressing cam portion 55b and a pawl-side cam surface 90b facing the pressing cam portion 55b in the radial direction is greater than a clearance Δ2 generated between the pressing cam portion 55c and a pawl-side cam surface 90c facing the pressing cam portion 55c in the radial direction.

Figure 4A:
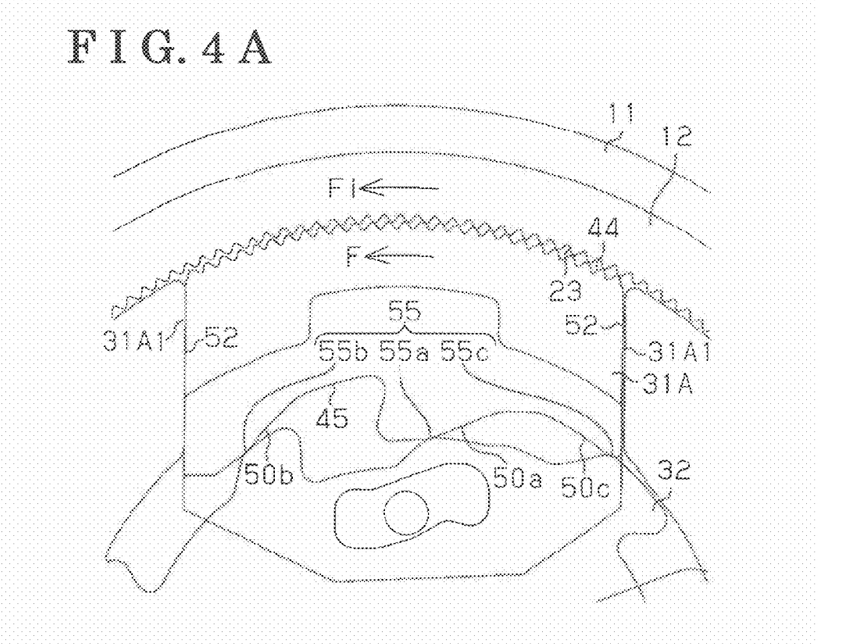
FIG. 4A is an enlarged view illustrating a state of the seat reclining apparatus for the vehicle of the first embodiment, where an external force is applied.

In the above-described state, in a case, for example, that an occupant leans against the seatback, an external force Fi is applied to the upper arm 12 in a rotational direction of the upper arm 12 and the external force Fi is transmitted as a force F to the first pawl 31A as shown in FIG. 4A, and thus, the force F works in the circumferential direction in which the first pawl 31A is inclined (that is, relative to the internal teeth 23). However, each of the clearances generated between the pawl-side cam surfaces 50a, 50b, 50c and the pressing cam portions 55a, 55b, 55c in the radial direction is the clearance Δ, which is extremely small, thereby restricting the first pawl 31A from inclining as described above.

Figure 4B:
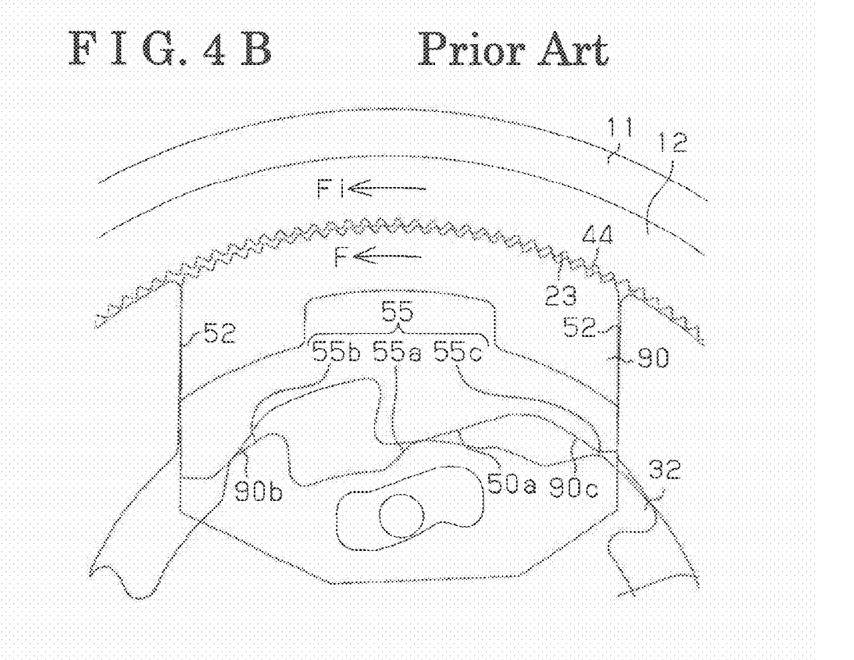
FIG. 4B is an enlarged view illustrating the state of the known seat reclining apparatus for the vehicle, where the external force is applied.

On the contrary, according to the first pawl 90 shown in FIG. 4B, in a case where the external force Fi is applied to the upper arm 12 in the rotational direction of the upper arm 12 and the external force Fi is transmitted as the force F to the first pawl 90, the force F works in the circumferential direction in which the first pawl 90 is inclined (that is, relative to the internal teeth). At this time, the clearance Δ1 generated between the pressing cam portion 55b and the pawl-side cam surface 90b facing the pressing cam portion 55b in the radial direction is greater than the clearance Δ2 generated between the pressing cam portion 55c and the pawl-side cam surface 90c facing the pressing cam portion 55c in the radial direction. Therefore, even though the clearance Δ2 is extremely small, the first pawl 31A is allowed to be inclined as described above by a difference between the clearances Δ1 and Δ2 (refer to FIG. 3C).

The pawl-side cam surfaces 50a, 50b, 50c of the second pawl 31B (the inner surface cam portion 48) or the cam surface 55 of the cam 32 is configured so that the cam surface 55 (the pressing cam portions 55a, 55b, 55c) is in contact with all of the pawl-side cam surfaces 50a, 50b, 50c of the second pawl 31B (the inner surface cam portion 48) in a state where the external teeth 47 and the internal teeth 23 are engaged with each other, and so that the clearances, which are generated between the pawl-side cam surfaces 50a, 50b, 50c of the second pawl 31B and the cam surface 55 (the pressing cam portions 55a, 55b, 55c) in the radial direction while the second pawl 31B moves radially in a direction in which the engagement between the external teeth 47 and the internal teeth 23 is released, are uniform. In addition, the pawl-side cam surfaces 50a, 50b of the third pawl 31C (the inner surface cam portion 48) are configured so that the cam surface 55 (the pressing cam portions 55a, 55b) is in contact with both of the pawl-side cam surfaces 50a, 50b of the third pawl 31C (the inner surface cam portion 48) in a state where the external teeth 47 and the internal teeth 23 are engaged with each other, and so that the clearances, which are generated between the pawl-side cam surfaces 50a, 50b of the third pawl 31C and the cam surface 55 (the pressing cam portions 55a, 55b) in the radial direction while the third pawl 31C moves radially in the direction in which the engagement between the external teeth 47 and the internal teeth 23 is released, are uniform.

Next, an operation of the first embodiment will be described. As shown in FIG. 1A, when the seat reclining apparatus 10 for the vehicle is in a locked state, the cam 32 is biased by the spiral spring 34 to rotate, and thus the pressing cam portions 55a, 55b of the cam 32 are in contact with the pawl-side cam surfaces 50a, 50b of the inner surface cam portions 45, 48 of the first pawl 31A, the second pawl 31B and the third pawl 31C, respectively. In addition, the pressing cam portions 55c of the cam 32 are in contact with the pawl-side cam surfaces 50c of the inner surface cam portions 45, 48 of the first pawl 31A and the second pawl 31B, respectively. Thus, the first pawl 31A, the second pawl 31B and the third pawl 31C are pressed outwardly in the radial direction. Accordingly, the external teeth 44, 47 of the first pawl 31A, the second pawl 31B and the third pawl 31C engage with the internal teeth 23 of the upper arm 12, thereby restricting the upper arm 12 from rotating relative to the lower arm 11.

In addition, the wedge member 73 disposed between the inclined surface 71 of the third pawl 31C and the guide wall 51 is pressed by the pressing cam portion 55c of the cam 32 outwardly in the radial direction. Due to a wedging action, the inclined surface 71 of the third pawl 31C and the guide wall 51 receive a force in the direction in which the third pawl 31C and the guide surface 52 of the guide wall 51 are away from each other. Accordingly, the lower arm 11 provided with the guide walls 51 and the upper arm 12 engaging with the first pawl 31A, the second pawl 31B and the third pawl 31C rotate relative to each other, and thus each of the clearances generated between the plural pawls arranged in the circumferential direction, that is, the first pawl 31A, the second pawl 31B, the third pawl 31C, and the guide walls 51 is removed. As a result, a backlash or a rattling of the seatback relative to the seat cushion is restricted.

Because the inclined surface 71 is positioned forward in the locking rotational direction of the cam 32, as the third pawl 31C is moved in the direction in which the third pawl 31C moves away from the corresponding guide wall 51, the clearances are generated between the cam 32 and the first to the third pawls 31A, 31B, 31C due to the wedging action. Consequently, the cam 32 is allowed to further rotate in the locking rotational direction, thereby restricting the first pawl 31A, the second pawl 31B and the third pawl 31C from being locked unreliably.

In the above-described state, by operating the operation handle in order to rotate the cam 32 integrally with the release plate 33 against the biasing force of the spiral spring 34, the pressing cam portions 55a, 55b of the cam 32 come out of contact from the pawl-side cam surfaces 50a, 50b of the inner surface cam portions 45, 48 of the first pawl 31A, the second pawl 31B, and the third pawl 31C, and the pressing cam portions 55c of the cam 32 come out of contact from the pawl-side cam surface 50c of the inner surface cam portions 45, 48 of the first pawl 31A and the second pawl 31B. Thus, the pressing cam portions 55a, 55b of the cam surface 55 come out of contact from the inner surface cam portions 45, 48 of the first pawl 31A, the second pawl 31B, and the third pawl 31C. Then, the first pawl 31A is pulled toward the rotational axis O1 along the guide surfaces 52 of the guide wall 51 by the effect of the engagement between the pawl-side groove cam portion 46 of the first pawl 31A and the engaging protrusion 57 of the cam 32, and thus the engagement between the external teeth 44 of the first pawl 31A and the Internal teeth 23 is released. At the same time the second pawl 31B and the third pawl 31C are pulled toward the rotational axis O1 along the guide surfaces 52 of the guide walls 51 by the effect of the engagement between the engaging protrusions 49 of the second and third pawls 31B, 31C and the release plate-side groove cam portions 59, and thus the engagement between the external teeth 47 of the second pawl 31B and the internal teeth 23, and the engagement between the external teeth 47 of the third pawl 31C and the internal teeth 23 are released. Accordingly, the seatback is allowed to rotate relative to the seat cushion so as to be in an arbitrary angular position.

Specifically, in the tooth tip-released state, each clearance generated between the pawl-side cam surfaces 50a, 50b, 50c of the first and second pawls 31A, 31B and the pressing cam portions 55a, 55b, 55c, and between the pawl-side cam surfaces 50a, 50b of the third pawl 31C and the pressing cam portions 55a, 55b in the radial direction is the clearance Δ, which is uniform and is extremely small. Thus, even in a case, for example, where the occupant leans against the seatback and the external force Fi is applied to the upper arm 12 in the rotational direction of the upper arm 12, the first pawl 31A is restricted from inclining in the circumferential direction (that is, relative to the internal teeth 23). Consequently, it is restricted that part of the external teeth 44 get caught by the internal teeth 23.

When the seat reclining apparatus 10 for the vehicle is in an unlocked state and the seatback is rotated relative to the seat cushion in a forward direction beyond a predetermined angle, that is, in a case where the seatback is rotated to be in a so-called range of forward leaning angle, each protrusion 25 formed at the inner circumferential surface 24a of the recessed portion 24 of the upper arm 12 comes to be positioned between an engaging portion 43 formed at the first pawl 31A and the internal teeth 23. In other words, the first pawl 31A is restricted from moving outwardly in the radial direction thereof because the engaging portion 43 of the first pawl 31A engages with the protrusion 25 of the upper arm 12. In the above-described state, when an operating force of the operation handle is released, the cam 32 is configured so that an action force of the spiral spring 34 causes the cam 32 to press the first pawl 31A toward the direction in which the internal teeth 23 engage with the external teeth 44, however, the first pawl 31A is prevented, by the engagement between the protrusion 25 of the upper arm 12 and the engaging portion 43 of the first pawl 31A, from moving. Thus, the engagement between the external teeth 44 of the first pawl 31A and the internal teeth 23 of the upper arm 12 is not established. At the same time, the first pawl 31A is restricted from moving radially outwardly, and therefore the cam 32 is restricted from rotating, as a result, the release plate 33 does not rotate. Thus, the second and third pawls 31B, 31C are kept, by the release plate-side groove cam portions 59, in the disengaged positions where the second and third pawls 31B, 31C are disengaged from the internal teeth 23. Consequently, the seatback is not locked and rotates freely relative to the seat cushion when the seatback is positioned in the range of the forward leaning angle (a forward leaning state).

When the seatback, which is in the forward leaning state, is returned backward by operating the operation handle so as to be in a position most suitable for the occupant to be seated, and the operating force of the operation handle is released while the seatback remains at the position most suitable for the occupant to be seated, the first pawl 31A, the second pawl 31B, the third pawl 31C, the cam 32 and the release plate 33 return to positions shown in FIG. 1A, and thus the locked state is established.

As described above, according to the first embodiment, following effects and advantages are obtained. (1) According to the first embodiment, the pawl-side cam surfaces 50a, 50b, 50c of the first pawl 31A (the inner surface cam portion 45) are formed so that the cam surface 55 (the pressing cam portions 55a, 55b, 55c) is in contact with all of the pawl-side cam surfaces 50a, 50b, 50c of the first pawl 31A (the inner surface cam portion 45) in a state where the external teeth 44 and the internal teeth 23 are engaged with each other. Further, the pawl-side cam surfaces 50a, 50b, 50c of the second pawl 31B (the inner surface cam portion 48) are configured so that the cam surface 55 (the pressing cam portions 55a, 55b, 55c) is in contact with all of the pawl-side cam surfaces 50a, 50b, 50c of the second pawl 31B (the inner surface cam portion 48) in a state where the external teeth 47 and the internal teeth 23 are engaged with each other. Still further, the pawl-side cam surfaces 50a, 50b of the third pawl 31C (the inner surface cam portion 48) are configured so that the cam surface 55 (the pressing cam portions 55a, 55b) is in contact with both of the pawl-side cam surfaces 50a, 50b of the third pawl 31C (the inner surface cam portion 48) in a state where the external teeth 47 and the internal teeth 23 are engaged with each other. Thus, postures of the first pawl 31A, the second pawl 31B and the third pawl 31C may be more stabilized in the locked state.

In addition, the pawl-side cam surfaces 50a, 50b, 50c of the first pawl 31A (the inner surface cam portion 45) are formed so that the clearances, which are generated between the pawl-side cam surfaces 50a, 50b, 50c of the first pawl 31A and the cam surface 55 (the pressing cam portions 55a, 55b, 55c) in the radial direction while the first pawl 31A moves radially in the direction in which the engagement between the external teeth 44 and the internal teeth 23 is released, are uniform. Further, the pawl-side cam surfaces 50a, 50b, 50c of the second pawl 31B (the inner surface cam portion 48) are formed so that the clearances, which are generated between the pawl-side cam surfaces 50a, 50b, 50c of the second pawl 31B and the cam surface 55 (the pressing cam portions 55a, 55b, 55c) in the radial direction while the second pawl 31B moves radially in the direction in which the engagement between the external teeth 47 and the internal teeth 23 is released, are uniform. Still further, the pawl-side cam surfaces 50a, 50b of the third pawl 31C (the inner surface cam portion 48) are formed so that the clearances, which are generated between the pawl-side cam surfaces 50a, 50b of the third pawl 31C and the cam surface 55 (the pressing cam portions 55a, 55b) in the radial direction while the third pawl 31B moves radially in the direction in which the engagement between the external teeth 47 and the internal teeth 23 is released, are uniform. Thus, in the tooth tip-released state, the first pawl 31A, the second pawl 31B or the third pawl 31C is not additionally inclined in the circumferential direction (that is, relative to the internal teeth 23) by a difference between one clearance and another clearance even though the external force is applied to the upper arm 12 in the rotational direction, unlike in a case where the clearances are not uniform. Accordingly, it is restricted that part of the external teeth 44, 47 get caught by the internal teeth 23, and deterioration of an operating feeling due to occurrence of an abnormal noise is restricted. Instead of the pawl-side cam surfaces 50a, 50b, 50c of each pawl, the cam surface 55 of the cam 32 may be formed so that the clearances, which are generated between the pawl-side cam surfaces 50a, 50b, 50c of the pawls and the cam surface 55 (the pressing cam portions 55a, 55b, 55c) in the radial direction while the pawls move radially in the direction in which the engagement between the external teeth 44, 47 and the internal teeth 23 is released, are uniform.

(2) According to the first embodiment, in the tooth tip-released state, even though the first and second pawls 31A, 31B are inclined in the circumferential direction (that is, relative to the internal teeth 23) due to that the external force is applied to the upper arm 12 in the rotational direction of the upper arm 12, the cam surface 55 is brought into contact with two pawl-side cam surfaces from among the pawl-side cam surfaces 50a, 50b, 50c of each of the first and second pawls 31A, 31B, that is, the two pawl-side cam surfaces including the pawl-side cam surface 50a. Thus, postures of the first and second pawls 31A, 31B may be more stabilized.

A second embodiment will be described with reference to FIGS. 5 to 7. In the second embodiment, an engagement structure between the pawl and the cam is changed from that of the first embodiment, and explanations on other structures that are identical to those of the first embodiment will be omitted.

Figure 5A:
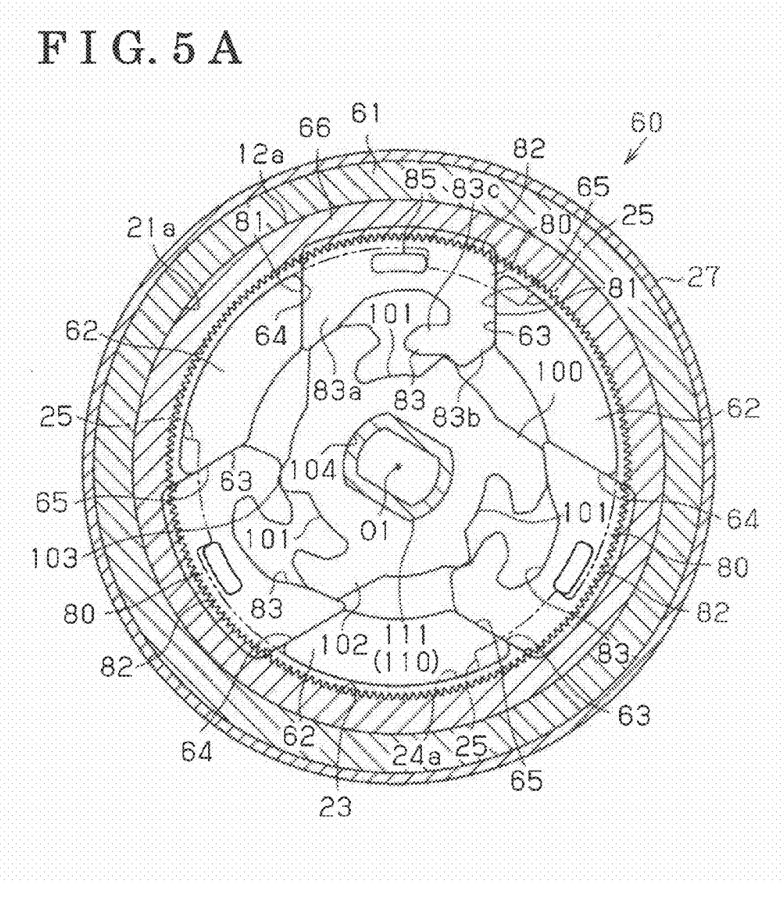
FIG. 5A is a lateral cross-sectional view illustrating a seat reclining apparatus for a vehicle of a second embodiment disclosed here.
Figure 5B:
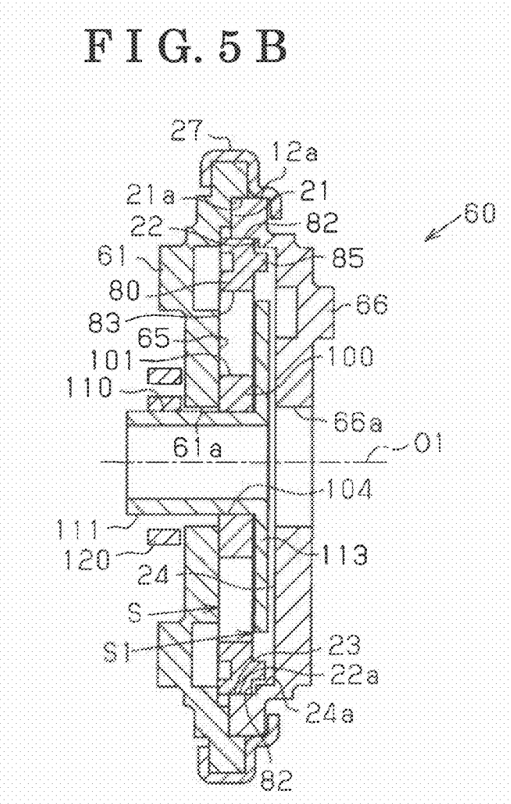
FIG. 5B is a longitudinal cross-sectional view illustrating the seat reclining apparatus for the vehicle of the second embodiment.

As shown in FIGS. 5A and 5B, a seat reclining apparatus 60 for a vehicle according to the second embodiment includes a lower arm 61 (i.e., the first arm) formed into a disc shape and an upper arm 66 (i.e., the second arm) formed into a disc shape. The lower arm 61 includes a through hole 61a formed in a circular shape at a central portion of the lower arm 61 along the rotational axis O1. The upper arm 66 includes a through hole 66a formed in a circular shape at a central portion of the upper arm 66 along the rotational axis O1. The through hole 61a and the through hole 66a have an equal inner diameter to each other.

Plural, for example, three protruding portions 62 each having a fan-shape are provided in an inside of the recessed portion 21 of the lower arm 61 so as to be aligned in a circumferential direction of the lower arm 61, leaving an equal angle between adjacent protruding portions 62. Each protruding portion 62 includes guide walls 63, 64 formed at side portions thereof in the circumferential direction, respectively. The guide wall 63 and the guide wall 64 of adjacent protruding portions 62, that is, the guide wall 63 and the guide wall 64 which face each other in the circumferential direction, extend parallel to each other in a radial direction whose center is the rotational axis O1. The protruding portions 62, in cooperation with a bottom surface of the recessed portion 21, form guide grooves 65 each having a substantially U-shaped groove configuration and each extending in the radial direction whose center is the rotational axis O1. The guide grooves 65 are provided in the circumferential direction of the lower arm 61, leaving an equal angle between adjacent guide grooves 65. The guide grooves 65 are in communication with one another at the central portion of the lower arm 61 and arranged in a substantially Y-shape as a whole.

Between the lower arm 61 and the upper arm 66, an accommodation space S accommodating plural, for example, three pawls 80 and a cam 100 is provided. The three pawls 80 are provided in plane perpendicular to the rotational axis O1 so as to be aligned in the circumferential direction, leaving an equal angle between adjacent pawls 80.

Each pawl 80 is made by, for example, pressing or stamping a steel plate, and is formed in a flat plate shape which has a substantially gate-like shape and basically includes no steps. Width-direction end portions 81 of each pawl 80 are formed to be straight lines parallel to each other. Each pawl 80 is provided to be movable in the radial direction in a manner that the width-direction end portions 81 slide on the guide walls 63, 64 of the guide groove 65.

External teeth 82, which are engageable with the internal teeth 23 of the upper arm 66, are formed at an outward end having an arc shape, that is, a radially outer surface (the end surface facing the internal teeth 23 of the upper arm 66) of each pawl 80. Each pawl 80 is arranged to fit within a range of a space, in the axial direction, in which the guide grooves 65 of the lower arm 61 and the recessed portion 22 (the internal teeth 23) of the upper arm 66 are formed. Thus, each pawl 80 moves, that is, reciprocates in the radial direction along the guide walls 63, 64 so that the external teeth 82 of each pawl 80 and the internal teeth 23 of the upper arm 66 engage with and disengage from each other. An engaging portion 85 having an arc shape is provided at each pawl 80 so as to face the recessed portion 24 (the inner circumferential surface 24a) in the radial direction and so as to protrude in the axial direction toward the upper arm 66.

Figure 7:
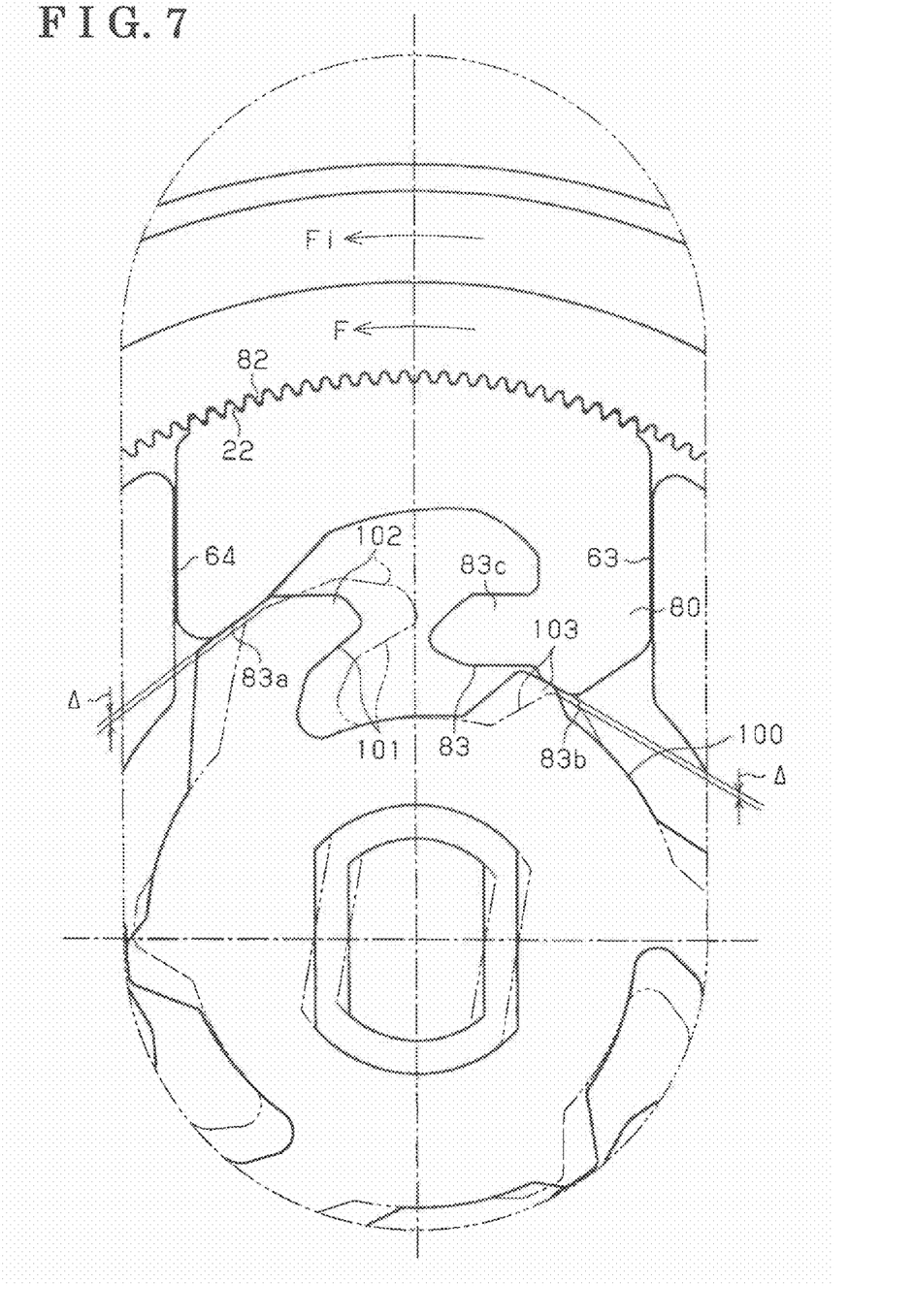
FIG. 7 is a view explaining a state of the seat reclining apparatus for the vehicle of the second embodiment immediately before an engaged state is released.

As illustrated in an enlarged view of FIG. 7, an inner surface cam portion 83 (i.e., the cam portion) which engages with an outer circumferential portion of the cam 100 is formed at an inward end, that is, a radially inner surface (the end surface facing the opposite direction to the outward end) of each pawl 80. The inner surface cam portion 83 is configured by a pair of pawl-side cam surfaces 83a, 83b (i.e., two pawl-side cam surfaces) arranged in a circumferential direction of the inner surface cam portion 83 and an engagement portion 83c. The pawl-side cam surface 83a and the pawl-side cam surface 83b are positioned at side portions of each pawl 80 which face a counter-clockwise rotational direction and a clockwise rotational direction in FIG. 7, respectively. The engagement portion 83c is positioned inside the substantially gate-like shape configured by the pawl-side cam surfaces 83a, 83b. In other words, the engagement portion 83c is positioned at an intermediate portion between the pawl-side cam surfaces 83a, 83b in the circumferential direction.

The cam 100 is made by, for example, pressing or stamping a steel plate so as to be formed into a plate shape including no steps. As shown in FIG. 58, the cam 100 is arranged to fit within the range of the space, in the axial direction, in which the guide grooves 65 of the lower arm 61 and the recessed portion 22 (the internal teeth 23) of the upper arm 66 are formed (that is, the range of the space in the axial direction in which the pawls 80 are positioned) so as to be rotatable about the rotational axis O1. As shown in FIG. 5A, at an central portion of the cam 100, a cam fitting hole 104 having a substantially ellipse shape is formed.

The cam 100 includes, plural, for example, three cam surfaces 101 provided at an outer circumferential edge of the cam 100 so as to be aligned in a circumferential direction, leaving an equal angle between adjacent cam surfaces 101. Each cam surface 101 is configured by a hook 102 positioned at a side portion of the cam surface 101 which faces the counter-clockwise rotational direction of the cam 100, and a shoulder portion 103 having a substantially triangular shape and positioned at a side portion of the cam surface 101 which faces the clockwise rotational direction of the cam 100 in FIG. 7. As the cam 100 rotates in the counter-clockwise rotational direction in FIG. 7, the hook 102 and the shoulder portion 103 of each cam surface 101 press the pawl-side cam surfaces 83a, 83b of the pawl 80 respectively, and thus the cam 100 presses the pawls 80 outwardly in a radial direction of the cam 100 along the guide grooves 65 of the lower arm 61. In other words, the hook 102 and the shoulder portion 103 are maintained at angular positions at which the hook 102 and the shoulder portion 103 come in contact with (are pressed against) the pawl-side cam surfaces 83a, 83b of the corresponding pawl 80 when the cam 100 is rotated to be at the locked position. At this time, in a case where none of the engaging portions 85 of the pawls 80 faces any of the protruding portions 25 of the upper arm 66 in the radial direction, the external teeth 82 of each pawl 80 engage with the internal teeth 23 of the upper arm 66.

According to the second embodiment, the pawl-side cam surfaces 83a, 83b are configured so that a distance in the radial direction between the rotational axis O1 and a pressing point of the pawl-side cam surface 83b (i.e., a second pawl-side cam surface), which is positioned rearward in a rotational direction of the cam 100 toward the locked position (the locking rotational direction), is set to be shorter than a distance in the radial direction between the rotational axis O1 and a pressing point of the pawl-side cam surface 83a (that is, a first pawl-side cam surface), which is positioned forward in the rotational direction of the cam 100 toward the locked position.

On the other hand, in a case where the engaging portion 85 of any of the engaging pawls 80 faces any of the protruding portions 25 of the upper arm 66 in the radial direction, the pawls 80 are blocked from moving outwardly in the radial direction and the cam 100 is blocked from rotating, and thus the external teeth 82 of the pawls 80 are unengageable with the internal teeth 23 of the upper arm 66.

As the cam 100 rotates in the counter-clockwise rotational direction in FIG. 7, each hook 102 formed for extending from the pressing point of the pawl-side cam surface 83a comes in contact with and engages with the engagement portion 83c of each pawl 80. Accordingly, the pawls 80 are pulled radially inwardly along the guide grooves 65 of the lower arm 61, and thus the engagement between the external teeth 82 of each pawl 80 and the internal teeth 23 of the upper arm 66 is released.

A hinge cam 110 is inserted and fitted in the cam fitting hole 104 of the cam 100. Specifically, the hinge cam 110 includes an axis line extending along the rotational axis O1. The hinge cam 110 includes a first shaft portion 111 penetrating through the lower arm 61 (the through hole 61a) and rotatably supported by the lower arm 61, and a flange portion 113 accommodated in a space S1 formed by the recessed portion 24 at a radially inner side of the engaging portion 85.

The first shaft portion 111 includes an outer wall surface formed into a substantially ellipse shape, and the hinge cam 110 fits into the cam fitting hole 104 of the cam 100 at the first shaft portion 111. Thus, the cam 100 is connected to the hinge cam 110 so as to rotate integrally therewith. The flange portion 113 is accommodated in the space S1 formed by the recessed portion 24 at the radially inner side of the engaging portion 85, thereby restricting all the pawls 80 and the cam 100 between the guide grooves 65 of the lower arm 61 and the flange portion 113 in the axial direction, that is, keeping all the pawls 80 and the cam 100 positioned between the guide grooves 65 and the flange portion 113 in the axial direction.

Figure 6:
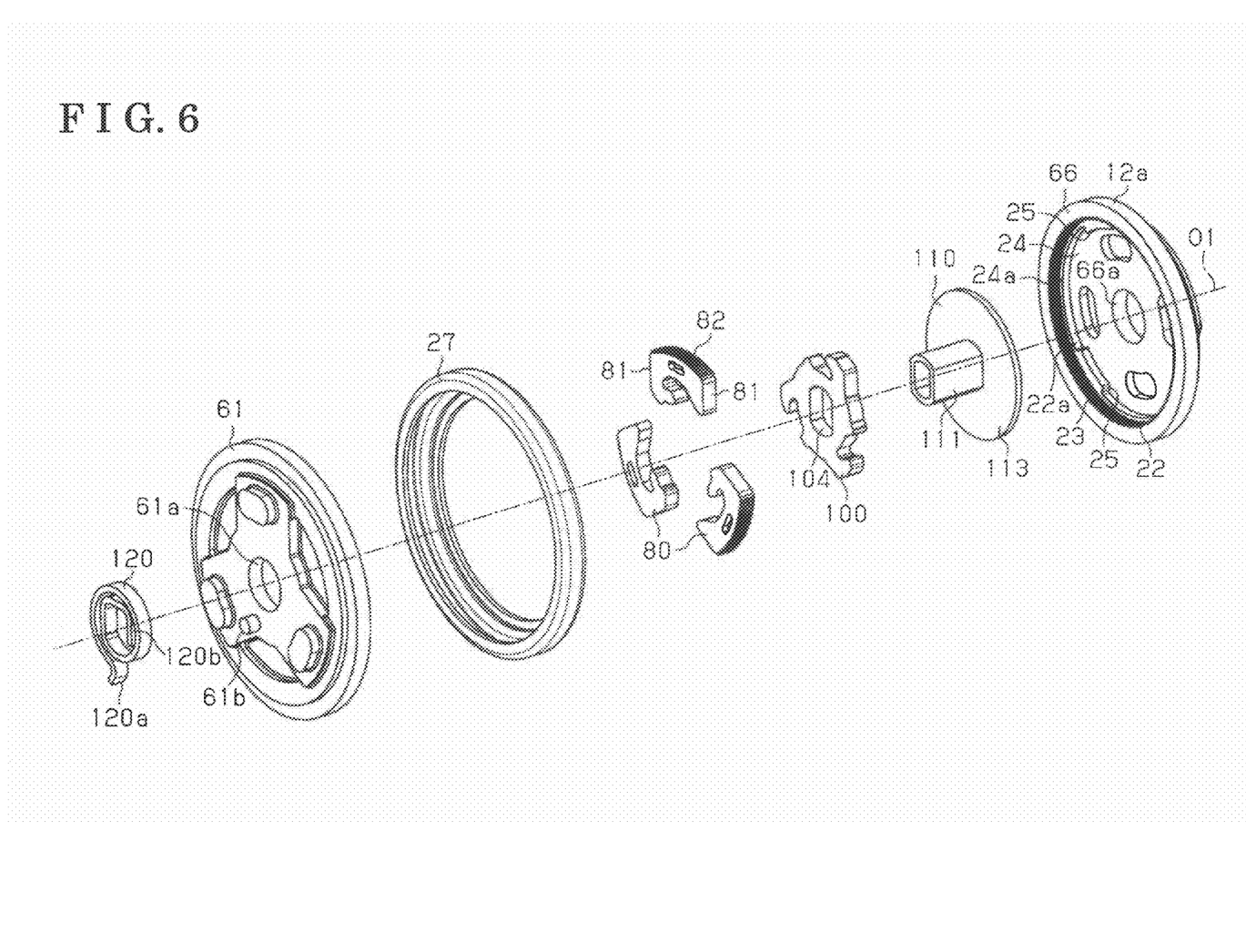
FIG. 6 is an exploded perspective view illustrating the seat reclining apparatus for the vehicle of the second embodiment.

As shown in FIG. 6, a leg portion 120b of a spiral spring 120 serving as the biasing member engages with the first shaft portion 111 of the hinge cam 110, and a leg portion 120a of the spiral spring 120 engages with an engagement protruding portion 61b of the lower arm 61. The spiral spring 120 biases the hinge cam 110 to rotate in one direction, thereby causing, via the cam 100, the pawls 80 to move in a radial direction in which the external teeth 82 and the internal teeth 23 engage with each other or in a radial direction in which the engaging portion 85 and the protruding portion 25 come in contact with each other.

In a case where an operating force for unlocking is inputted from an operation member (e.g., an operation handle), the hinge cam 110 is rotated against a biasing force of the spiral spring 120 in the opposite direction to a biasing direction of the spiral spring 120. At this time, the hinge cam 110 causes, via the cam 100, the pawls 80 to move in a radial direction in which the external teeth 82 and the internal teeth 23 disengage from each other.

Here, as drawn with solid lines in FIG. 7, the pawl-side cam surfaces 83a, 83b of each pawl 80 (the inner surface cam portion 83) or the cam surfaces 101 of the cam 100 are configured so that the cam surface 101 (the hook 102 and the shoulder portion 103) is in contact with both of the pawl-side cam surfaces 83a, 83b in a state where the external teeth 82 and the internal teeth 23 engage with each other, and so that clearances, which are generated between the pawl-side cam surfaces 83a, 83b and the cam surface 101 (the hook 102 and the shoulder portion 103) in the radial direction while the pawls 80 move radially in the direction in which the engagement between the external teeth 82 and the internal teeth 23 comes to be released, are all uniform. As drawn with double-dotted lines in FIG. 7, for example, immediately before the engagement between the external teeth 82 and the internal teeth 23 is released (hereinafter referred to also as the tooth tip-released state), each of the clearances generated between the pawl-side cam surfaces 83a, 83b, and the hook 102 and the shoulder portion 103 in the radial direction is the clearance Δ, which is extremely small.

In the above-described state, in a case, for example, that the occupant leans against the seatback, the external force Fi is applied to the upper arm 66 in a rotational direction of the upper arm 66 and the external force Fi is transmitted as the force F to the pawls 80, and thus, the force F works in the circumferential direction in which the pawls 80 are inclined (that is, relative to the internal teeth 23). However, each of the clearances generated between the pawl-side cam surfaces 83a, 83b, and the hook 102 and the shoulder portion 103 in the radial direction is the clearance Δ, which is extremely small, thereby restricting the pawl 80 from inclining as described above.

Next, an operation of the second embodiment will be described. As shown in FIG. 7, when the seat reclining apparatus 60 for the vehicle is in the locked state, the cam 100 is biased by the spiral spring 120 to rotate in the counter-clockwise rotational direction in FIG. 7, and thus the hook 102 and the shoulder portion 103 of the cam 100 are in contact with the pawl-side cam surfaces 83a, 83b of the corresponding pawl 80. Accordingly, the pawls 80 are pressed outwardly in the radial direction and the external teeth 82 of each pawl 80 engage with the internal teeth 23 of the upper arm 66, thereby restricting the upper arm 66 from rotating relative to the lower arm 61. Consequently, a rotation of the seatback relative to the seat cushion is restricted (locked).

In the above-described state, by operating the operation handle in order to rotate the hinge cam 110 integrally with the cam 100 against the biasing force of the spiral spring 120, the hook 102 and the shoulder portion 103 of the cam 100 come out of contact from the pawl-side cam surfaces 83a, 83b of the pawl 80, respectively. Then, each pawl 80 is pulled toward the rotational axis O1 along the guide walls 63, 64 by the effect of the engagement between the engagement portion 83c of the pawl 80 and the hook 102 of the cam 100, and thus the engagement between the external teeth 82 of the pawl BO and the internal teeth 23 is released. Accordingly, the seatback is allowed to rotate relative to the seat cushion so as to be in the arbitrary angular position.

Specifically, in the tooth tip-released state, each clearance generated in the radial direction between the pawl-side cam surfaces 83a, 83b of each pawl 80, and the hook 102 and the shoulder portion 103 of each cam surface 101 is the clearance Δ, which is extremely small. Thus, even in a case, for example, where the occupant leans against the seatback and the external force Fi is applied to the upper arm 66 in the rotational direction of the upper arm 66, the pawls 80 are restricted from inclining in the circumferential direction (that is, relative to the internal teeth 23). Consequently, it is restricted that part of the external teeth 82 get caught by the internal teeth 23.

When the seat reclining apparatus 60 for the vehicle is in the unlocked state and the seatback is rotated relative to the seat cushion in the forward direction beyond the predetermined angle, that is, in a case where the seatback is rotated to be at the so-called range of forward leaning angle, the protrusions 25 formed at the inner circumferential surface 24a of the recessed portion 24 of the upper arm 66 come to be positioned between the engaging portion 85 formed at each pawl 80 and the internal teeth 23. In other words, the pawl 80 is restricted from moving outwardly in the radial direction thereof because the engaging portion 85 of the pawl 80 engages with the protrusion 25 of the upper arm 66. In the above-described state, in a case where the operating force of the operation handle is released, the pawl 80 is prevented from moving by the engagement between the protrusion 25 of the upper arm 66 and the engaging portion 85 of the pawl 80 although the cam 100 is configured so that the action force of the spiral spring 120 causes the cam 100 to press the pawl 80 toward the direction in which the pawl 80 (the external teeth 82) engages with the internal teeth 23. Accordingly, the engagement between the external teeth 82 of each pawl 80 and the internal teeth 23 of the upper arm 66 is not established. Consequently, the seatback is not locked and rotates freely relative to the seat cushion when the seatback is positioned in the range of forward leaning angle.

When the seatback, which is in the forward leaning state, is returned backward by operating the operation handle so as to be in the position most suitable for the occupant to be seated and the operating force of the operation handle is released while the seatback remains at the position most suitable for the occupant to be seated, the pawls 80 and the cam 100 return to positions shown in FIG. 5A, and thus the locked state is established.

Specifically, the flange portion 113 of the hinge cam 110 is accommodated in the space S1 formed by the recessed portion 24 at the radially inner side of the engaging portion 85, and thus the flange portion 113 restricts all the pawls 80 and the cam 100 in the axial direction. Accordingly, postures of the pawls 80 and the cam 100 may be stably maintained.

According to the second embodiment described above, the following effects and advantages are attained in addition to the effect and advantage (1) attained according to the first embodiment. (3) According to the pawls 80 of the second embodiment, the two pawl-side cam surfaces 83a, 83b are, for example, in contact with the cam 100 (the hook 102 and the shoulder portion 103). Thus, when an engaged state of the external teeth 82 and the internal teeth 23 is about to be released under a condition that the external force is applied in the rotational direction, one of the pawl-side cam surfaces 83a and 83b serves as a supporting point, and the other one of the pawl-side cam surfaces 83a and 83b serves as a holding surface, corresponding to the rotational direction, for restricting the external teeth 82 from inclining relative to the internal teeth 23. Accordingly, the inclination of the external teeth 82 relative to the internal teeth 23 is restricted, thereby further stabilizing the postures of the pawls 80.

Changes and modifications may be made to the first and second embodiments. In the first embodiment, the seat reclining apparatus 10 for the vehicle may employ a structure including three first pawls 31A so that all the first pawls 31A are operated directly by the cam 32 instead of the structure including the three types of pawls (the first pawl 31A, the second pawl 31B and the third pawl 31C) and the release plate 33. In the first and second embodiments, the pawl-side cam surfaces 50a, 50b, 50c are configured so that the clearances, which are generated between the pawl-side cam surfaces 50a, 50b, 50c and the cam surface 55 in the radial direction while the pawl 31A, 31B, 31C, 80 moves radially in the direction in which the engagement between the external teeth 44, 47, 82 and the internal teeth 23 comes to be released, are all uniform. However, the cam surface 55, 101 may be configured so that the clearances, which are generated between the pawl-side cam surfaces 50a, 50b, 50c and the cam surface 55 in the radial direction while the pawl 31A, 31B, 31C, 80 moves radially in the direction in which the engagement between the external teeth 44, 47, 82 and the internal teeth 23 comes to be released, are all uniform.

In the first and second embodiments, the number of the pawl-side cam surfaces formed at each pawl may be arbitrarily determined provided that plural pawl-side cam surfaces are formed. In the first and second embodiments, the clearances generated between the plural pawl-side cam surfaces and the cam surfaces in the radial direction do not have to be completely uniform, but may include a minor variation within a range in which occurrence of the abnormal noise is restricted.

In the first and second embodiments, the number of the pawls arranged in the lower arm 11, 61 may be arbitrarily determined. In a case where plural pawls are arranged, provided that the pawls move associated with each other or with one another, the pawls may include different shapes from each other or one another, or an identical shape.

In the first and second embodiments, the lower arm 11, 61 may be fixed to the seatback and the upper arm 12, 66 may be fixed to the seat cushion.

According to the first and the second embodiments, the seat reclining apparatus 10, 60 for the vehicle, includes the lower arm 11, 61 configured to be fixedly attached to one of the seat cushion and the seatback, the upper arm 12, 66 configured to be fixedly attached to the other one of the seat cushion and the seatback and rotatably supported by the lower arm 11, 61, the first pawl 31A, the second pawl 31B, the third pawl 31C, the pawl 80, of which movement in the radial direction is guided by the guide wall 51, 63, 64 provided at the lower arm 11, 61, including the external teeth 44, 47, 82 which are provided at the radially outer surface of the first pawl 31A, the second pawl 31B, the third pawl 31C, the pawl 80 and are engageable with the internal teeth 23 provided at the upper arm 12, 66, the first pawl 31A, the second pawl 31B, the third pawl 31C, the pawl 80 including the inner surface cam portion 45, 48, 83 formed at the radially inner surface thereof and the plural pawl-side cam surfaces 50a, 50b, 50c, 83a, 83b arranged at the inner surface cam portion 45, 48, 83 in the circumferential direction of the inner surface cam portion 45, 48, 83, the cam 32, 100 engaging with the pawl 31A, 31B, 31C, 80 and rotatably provided at the central portion of the lower arm 11, 16, the cam 32, 100 including the cam surface 55, 101 engaging with the inner surface cam portion 45, 48, 83 formed at the first pawl 31A, the second pawl 31B, the third pawl 31C, the pawl 80, and the spiral spring 34, 120 biasing the cam 32, 100 to rotate in one direction and causing the cam surface 55, 101 to press the inner surface cam portion 45, 48, 83 in the radial direction in which the external teeth 44, 47, 82 and the internal teeth 23 engage with each other. The plural pawl-side cam surfaces 50a, 50b, 50c, 83a, 83b or the cam surface 55, 101 is configured in a manner that the plural pawl-side cam surfaces 50a, 50b, 50c, 83a, 83b and the cam surface 55, 101 are in contact with each other when the external teeth 44, 47, 82 and the internal teeth 23 are in the engaged state and in a manner that the clearances, which are generated between each of the plural pawl-side cam surfaces 50a, 50b, 50c, 83a, 83b and the cam surface 55, 101 in the radial direction when the pawl 31A, 31B, 31C, 80 is moved by the rotational operation of the cam 32, 100 against the biasing force of the spiral spring 34, 120 in the radial direction in which the engaged state of the external teeth 44, 47, 82 and the internal teeth 23 is released, are all uniform.

According to the above described structure, the cam surface 55, 101 is in contact with the plural pawl-side cam surfaces 50a, 50b, 50c, 83a, 83b of the inner surface cam portion 45, 48, 83 when the external teeth 44, 47, 82 and the internal teeth 23 are in the engaged state, thereby further stabilizing the posture of the first pawl 31A, the second pawl 31B, the third pawl 31C, the pawl 80. On the other hand, when the first pawl 31A, the second pawl 31B, the third pawl 31C, the pawl 80 moves in the radial direction in which the engagement of the external teeth 44, 47, 82 and the internal teeth 23 is released, the clearances generated between each of the plural pawl-side cam surfaces 50a, 50b, 50c, 83a, 83b of the inner surface cam portion 45, 48, 83 and the cam surface 55, 101 in the radial direction are all uniform. Consequently, even though the external force Fi is applied in the rotational direction, for example, immediately before the engagement of the external teeth 44, 47, 82 and the internal teeth 23 is released, that is, while the external teeth 44, 47, 82 and the internal teeth 23 are imperfectly engaged with each other, the first pawl 31A, the second pawl 31B, the third pawl 31C, the pawl 80 is not additionally inclined in the circumferential direction (that is, relative to the internal teeth 23) by a difference between one clearance and another clearance, unlike in a case where the clearances are not uniform. Accordingly, it is restricted that part of the external teeth 44, 47, 82 get caught by the internal teeth 23, and the deterioration of the operating feeling due to the occurrence of the abnormal noise is restricted.

According to the first embodiment, the plural pawl-side cam surfaces 50a, 50b, 50c, 83a, 83b are the three pawl-side cam surfaces 50a, 50b, 50c.

According to the above described structure, even though the first to third pawls 31A, 31B, 31C are inclined in the circumferential direction (that is, relative to the internal teeth 23) when the external force F is applied in the rotational direction, the cam surface 55 is brought into contact with the two pawl-side cam surfaces, that is, the two pawl-side cam surfaces including the cam surface 50a interposed between the other pawl-side cam surfaces 50b, 50c. Thus, the first to third pawls 31A, 31B, 31C may be more stabilized.

According to the second embodiment, the plural pawl-side cam surfaces 50a, 50b, 50c, 83a, 83b are the two pawl-side cam surfaces 83a, 83b.

According to the above described structure, when the engaged state of the external teeth 82 and the internal teeth 23 is about to be released under the condition that the external force F is applied in the rotational direction, one of the pawl-side cam surfaces 83a and 83b serves as the supporting point, and the other one of the pawl-side cam surfaces 83a and 83b serves as the holding surface for restricting the external teeth 82 from inclining relative to the internal teeth 23. Accordingly, the inclination of the external teeth 82 relative to the internal teeth 23 is restricted, thereby further stabilizing the postures of the pawls 80.

According to the second embodiment, the plural pawl-side cam surfaces 83a, 83b include the first pawl-side cam surface 83a and the second pawl-side cam surface 83b, and the first and second pawl-side cam surfaces 83a, 83b are set in a manner that the distance in the radial direction between the rotational axis O1 and the pressing point of the second pawl-side cam surface 83b is shorter than the distance in the radial direction between the rotational axis O1 and the pressing point of the first pawl-side cam surface 83a. The first pawl-side cam surface 83a is positioned forward and the second pawl-side cam surface 83b is positioned rearward in the rotational direction of the cam 100 when the cam 100 moves the pawl 80 in the radial direction in which the external teeth 82 and the internal teeth 23 come to engage with each other. The cam 100 includes the hook 102 formed for extending from the pressing point of the first pawl-side cam surface 83a. The pawl 80 includes the engagement portion 83c positioned at the intermediate portion between the first and second pawl-side cam surfaces 83a, 83b in the circumferential direction of the first and second pawl-side cam surfaces 83a, 83b, and the engagement portion 83c engages with the hook 102 in case that the cam 100 rotates for moving the pawl 80 in the radial direction in which the engaged state of the external teeth 82 and the internal teeth 23 is released.

According to the first and second embodiments, the pawl 31A, 31B, 31C, 80 includes the plural pawls 31A, 31B, 31C, 80 and the plural pawls 31A, 31B, 31C, 80 move associated with each other or one another.

According to the first and second embodiments, the plural pawls 31A, 31B, 31C, 80 include the different shapes from each other or one another.

According to the first embodiment, the cam surface 55 includes the pressing cam portion 55a, 55b, 55c being in contact with the pawl-side cam surfaces 50a, 50b, 50c when the external teeth 44, 47 and the internal teeth 23 are in the engaged state, and the number of the pressing cam portion 55a, 55b, 55c is same as the number of the pawl-side cam surfaces 50a, 50b, 50c.

According to the first and second embodiments, the seat reclining apparatus 10, 60 for the vehicle, in which the operating feeling is improved in a case where the external force Fi is applied during a releasing operation of the engagement between the internal teeth 23 and the external teeth 44, 47, 82 of the first pawl 31A, the second pawl 31B, the third pawl 31, the pawl 80.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat reclining apparatus for a vehicle, comprising:
a first arm configured to be fixedly attached to one of a seat cushion and a seatback;
a second arm configured to be fixedly attached to the other one of the seat cushion and the seatback, the second arm rotatably supported by the first arm;
a pawl, of which movement in a radial direction is guided by a guide wall provided at the first arm, including external teeth which are provided at a radially outer surface of the pawl and are engageable with internal teeth provided at the second arm, the pawl including a cam portion formed at a radially inner surface of the pawl and the cam portion includes a plurality of pawl-side cam surfaces arranged in a circumferential direction of the cam portion;
a cam engaging with the pawl and rotatably provided at a central portion of the first arm, the cam including a cam surface engaging with the cam portion formed at the pawl; and
a biasing member biasing the cam to rotate in one direction and causing the cam surface to press the cam portion in a radial direction in which the external teeth and the internal teeth engage with each other, wherein
the plurality of pawl-side cam surfaces or the cam surface include a shape so that the plurality of pawl-side cam surfaces and the cam surface are in contact with each other when the external teeth and the internal teeth are in an engaged state, and
the plurality of pawl-side cam surfaces or the cam surface include a shape so that clearances, between each of the plurality of pawl-side cam surfaces and the cam surface in the radial direction when the pawl is moved by a rotational operation of the cam against a biasing force of the biasing member in the radial direction in which the engaged state of the external teeth and the internal teeth is released, are all uniform.

2. The seat reclining apparatus for the vehicle according to claim 1, wherein the plurality of pawl-side cam surfaces are three pawl-side cam surfaces.

3. The seat reclining apparatus for the vehicle according to claim 1, wherein the plurality of pawl-side cam surfaces are two pawl-side cam surfaces.

4. The seat reclining apparatus for the vehicle according to claim 3, wherein
the plurality of pawl-side cam surfaces include a first pawl-side cam surface and a second pawl-side cam surface, and
the first and second pawl-side cam surfaces are set in a manner that a distance in the radial direction between a rotational axis and a pressing point of the second pawl-side cam surface is shorter than a distance in the radial direction between the rotational axis and a pressing point of the first pawl-side cam surface, the cam includes a hook formed for extending from the pressing point of the first pawl-side cam surface, and the pawl includes an engagement portion positioned at an intermediate portion between the first and second pawl-side cam surfaces in a circumferential direction of the first and second pawl-side cam surfaces, and the engagement portion engages with the hook in case that the cam rotates for moving the pawl in the radial direction in which the engaged state of the external teeth and the internal teeth is released.

5. The seat reclining apparatus for the vehicle according to claim 1, wherein the pawl includes a plurality of pawls and the plurality of pawls move associated with each other.

6. The seat reclining apparatus for the vehicle according to claim 5, wherein the plurality of pawls include different shapes from each other.

7. The seat reclining apparatus for the vehicle according to claim 1, wherein the cam surface includes a plurality of pressing cam portions being in contact with the pawl-side cam surfaces when the external teeth and the internal teeth are in the engaged state, and a number of the pressing cam portions is same as a number of the pawl-side cam surfaces.

8. A seat reclining apparatus for a vehicle, comprising:
a first arm configured to be fixedly attached to one of a seat cushion and a seatback;
a second arm configured to be fixedly attached to the other one of the seat cushion and the seatback, the second arm rotatably supported by the first arm;
a pawl, of which movement in a radial direction is guided by a guide wall provided at the first arm, including external teeth which are provided at a radially outer surface of the pawl and are engageable with internal teeth provided at the second arm, the pawl including a cam portion formed at a radially inner surface of the pawl and the cam portion includes a plurality of pawl-side cam surfaces arranged in a circumferential direction of the cam portion;
a cam engaging with the pawl and rotatably provided at a central portion of the first arm, the cam including a cam surface engaging with the cam portion formed at the pawl; and
a biasing member biasing the cam to rotate in one direction and causing the cam surface to press the cam portion in a radial direction in which the external teeth and the internal teeth engage with each other, wherein the plurality of pawl-side cam surfaces or the cam surface include a shape so that the plurality of pawl-side cam surfaces respectively contact the cam surface when the external teeth and the internal teeth are in an engaged state where the external teeth and the internal teeth are engaged with each other until the external teeth and the internal teeth are brought away from each other by a movement of the pawl in the radial direction in which the engaged state is released, and the plurality of pawl-side cam surfaces or the cam surface include a shape so that clearances, between each of the plurality of pawl-side cam surfaces and the cam surface in the radial direction when the pawl is moved by a rotational operation of the cam against a biasing force of the biasing member in the radial direction in which the engaged state of the external teeth and the internal teeth is released, are all uniform.

* * * * *